July 1, 1930.  A. R. KRAUSE ET AL  1,768,912
TREAD FORMING MACHINE
Filed Feb. 9, 1927    3 Sheets-Sheet 3

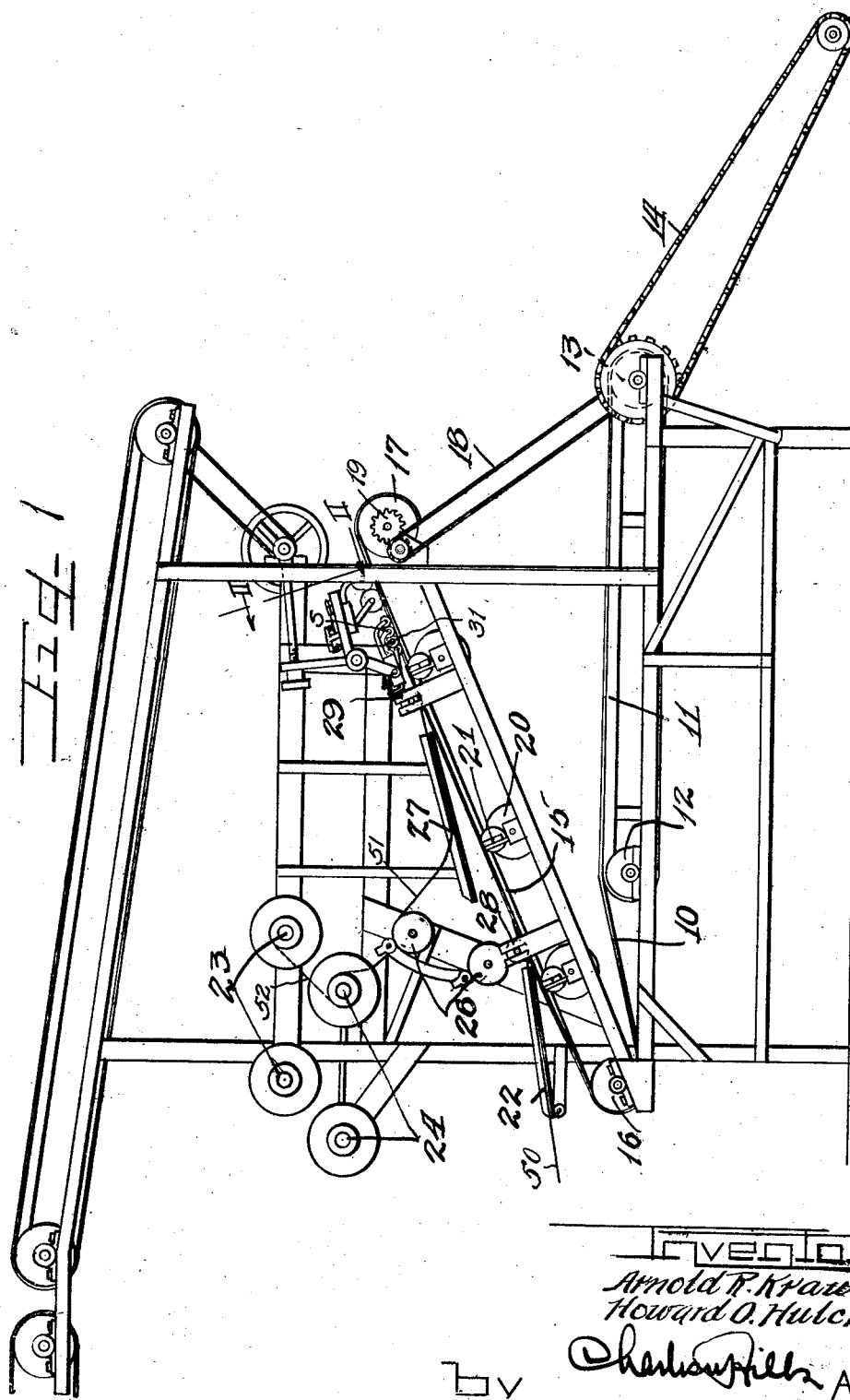

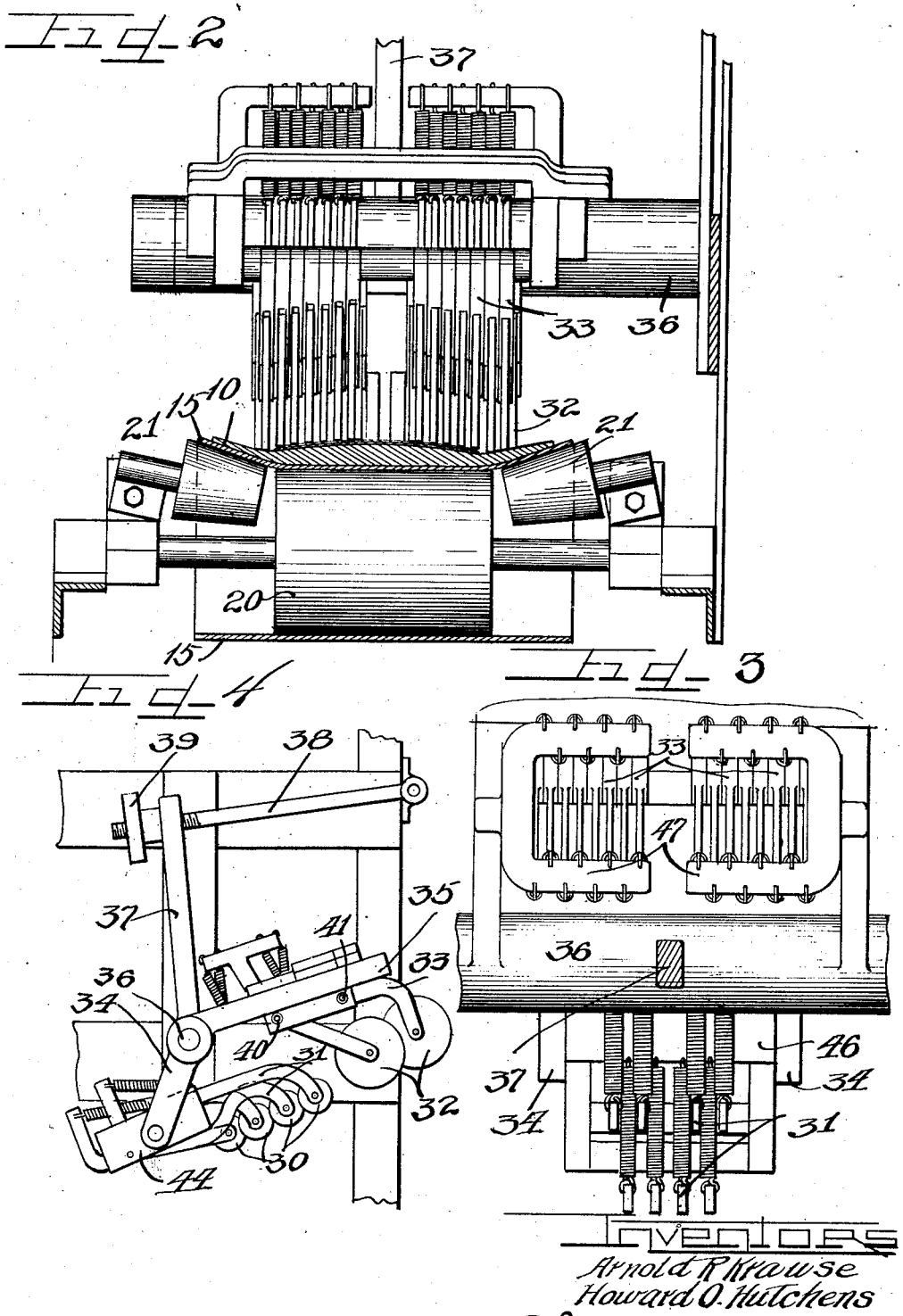

Inventors
Arnold R. Krause
Howard O. Hutchens
by Charles Hill Attys.

Patented July 1, 1930

1,768,912

UNITED STATES PATENT OFFICE

ARNOLD R. KRAUSE AND HOWARD O. HUTCHENS, OF EAU CLAIRE, WISCONSIN, ASSIGNORS TO GILLETTE RUBBER COMPANY, OF EAU CLAIRE, WISCONSIN, A CORPORATION OF WISCONSIN

TREAD-FORMING MACHINE

Application filed February 9, 1927. Serial No. 166,845.

This invention relates to an improved tread stock building machine and forms an improvement on the general type of machine shown in the Arnold R. Krause co-pending application Serial No. 106,357, filed May 3rd, 1926, entitled "Tread forming and finishing machine."

It is an object of this invention to provide an improved stitching mechanism to apply breaker and cushion stock to the irregular surface of a strip of tread stock. In the co-pending application mentioned above, rollers are used to press the cushion and breaker strips onto the tread stock and we have found it desirable to progressively stitch the added layers to the base stock by means of individual stitching wheels first contacting the center and progressively working out to the edges of the material to work out air pockets and smooth out wrinkles in the material.

Other and further important objects of this invention will be apparent from the disclosures in the drawings and specification.

The invention (in a preferred form) is illustrated in the drawings and hereinafter more fully described.

On the drawings:

Figure 1 is a side elevation of a tread stock building machine embodying the features of this invention.

Figure 2 is an enlarged fragmentary section on the line II—II of Figure 1.

Figure 3 is a fragmentary top plan view of Figure 2.

Figure 4 is a fragmentary side elevation of the stitching mechanism.

As shown on the drawings:

Figure 5:
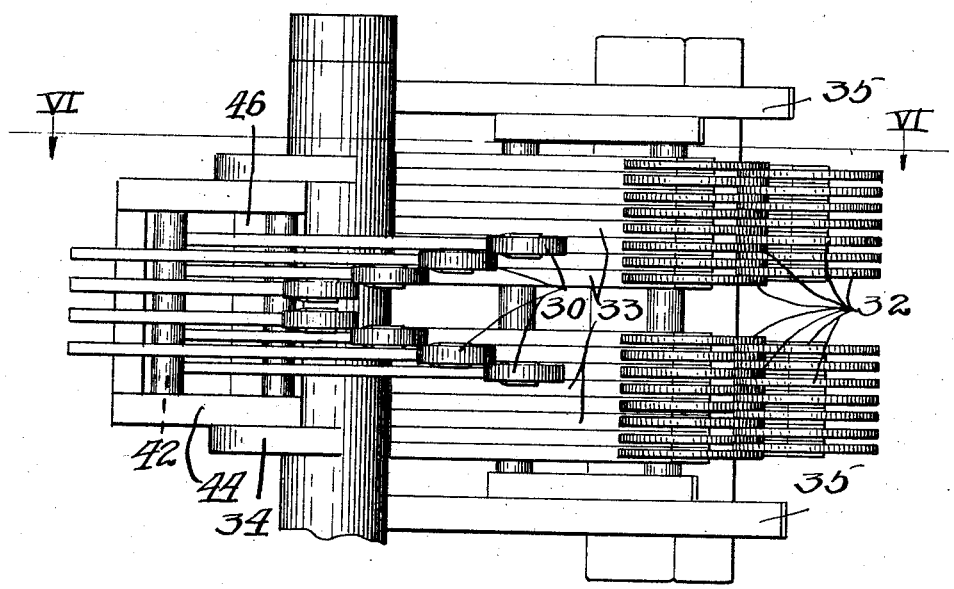
Figure 5 is a bottom view of the stitching mechanism.

The tread building machine shown in Figure 1 resembles in its general arrangement that of the copending application previously mentioned so that only a brief description thereof is believed to be necessary as to matter common to the two applications.

Raw rubber tread stock 10 is fed onto a horizontal conveyor belt 11 supported by the pulleys 12 and 13, the pulley 13 being driven by a chain 14 associated with the tread stock supplying mechanism. From the horizontal conveyor 11 the stock is fed onto an inclined belt conveyor 15 having end pulleys 16 and 17, the pulley 17 being driven by chain 18 from the pulley shaft 13 through suitable gears 19 to produce the desired direction of motion of the inclined conveyor belt. It will be noted that the tread stock is in an inverted position on the inclined conveyor by reason of its passage under the lower end thereof, involving a reversal of its direction of motion.

Three intermediate central supporting rollers 20 are shown disposed along the inclined conveyor with smaller flanking rollers 21 on inclined axes on either side to produce a trough like cross-section in the belt substantially conforming to the outline of the tread stock in order that the upper or inner side thereof may be substantially flat for the application of cushion and breaker stock thereto.

Cushion and breaker fabric stock is supplied in continuous lengths, the breaker stock 50 being previously cut and spliced and fed onto the tread stock over a feeding apron 22. The cushion rubber stock 51 comes in long lengths wound on spools with a length of fabric backing 52 interposed between the adjacent layers of rubber, complete reels being mounted on both of the stub axles 23 and wind up reels for the backing fabric being mounted on the axles 24, the reels being used alternately to supply the cushion stock without requiring a shut down of the entire machine while changing reels. The wind up reels may be positively driven by any suitable means such for example as a conventional belt drive (not shown) so as to pull the cushion stock off the spools on either of the axles 23 by means of the backing cloth itself. The cushion stock is fed over guide rolls 26, one for each reel of stock, and thence over a feeding apron 27 to the tread stock on the inclined conveyor.

The fabric breaker stock is rolled into initial contact with the tread stock by the roll 28 just beyond the end of the apron 22, while the cushion stock is rolled on top of the breaker stock by a second roll 29 just beyond the end of the apron 27, both the rolls 28 and 29 being offset relative to the supporting rollers 20 in order to take advantage of the elasticity of the conveyor belt to cause the upper surface of the tread stock to assume a flat section.

The improvement of the present invention comprises a stitching apparatus indicated generally in Figure 1 by "S" mounted beyond the roll 29 and comprising a series of independent rollers 30 so mounted on individual fingers 31 as to have a progressively outward stitching action from the center line on the material passing thereunder and followed by two sets of staggered interfitting rollers 32 mounted on arms 33 to operate on the outer margins of the material applied to the tread stock. These rollers or stitchers act to roll out air pockets or wrinkles in the applied material and thus produce an even and firm bond between the layers of material.

Figure 6:
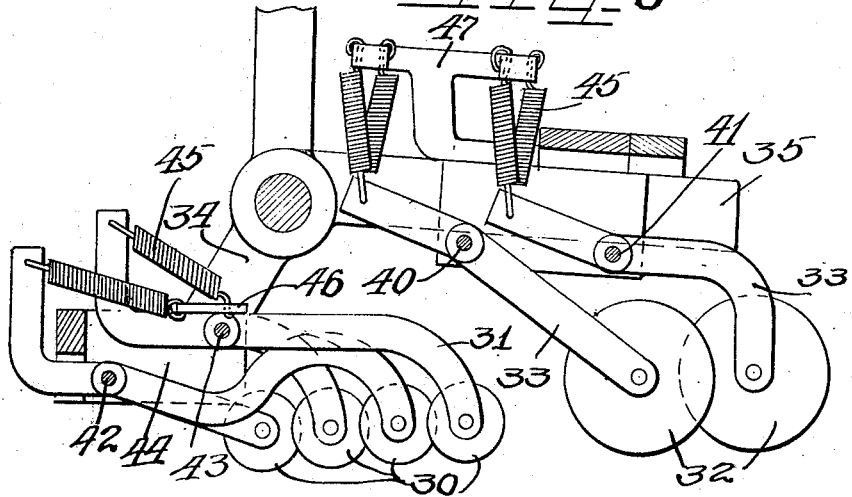
Figure 6 is a section on the line VI—VI of Figure 5.

The mounting means for the two series of rollers comprises a frame-like structure comprising arms 34 and 35 pivoted about a supporting bar 36 and adjustably positioned to vary the roller pressure by means of an upright forked arm 37 with a threaded rod 38 passing through the fork, with a nut 39 bearing against the fork. An inspection of Figures 4 and 6 will show that screwing up this nut 39 will tilt the right hand arms 35 down to increase the pressure of the rollers 32, the arms 33 of which are alternately pivoted at 40 and 41 to permit the rollers to intermesh. In order that the corresponding movement of the arms 34 will not lighten the pressure on the rollers 30, the arms 31 are pivoted at 42 and 43 in a block 44 rigidly secured to the arms 34 so that although the pivot points 42 and 43 actually move upwardly when the adjustment is changed to increase the pressure, the block 44 tilts clockwise to change the angular position of the fingers or arms 31 and therefore increases the pressure of the rollers 30.

Each of the fingers or arms 31 and 33 are provided with individual springs 45 tending to force the corresponding rollers down onto the work, spring anchors 46 and 47 being provided across the arms 34 and 35. It will thus be seen that each individual roller is free to move independently of the movement of the rollers on either side and the interfitting rollers 32 supplement each other to cover the surface without gaps between the rollers as would otherwise be required by the space required by the arms or fingers 33.

In the operation of the stitcher the rollers 30 operate to progressively stitch the materials together from the center line outwardly while the rollers 32 operate on the margins of the applied materials and provide for varying widths thereof by extending out close to the edges of the side wall portions of the tread.

We are aware that many changes may be made and numerous details of construction may be varied through a wide range without departing from the principles of this invention and we, therefore, do not purpose limiting the patent granted hereon, otherwise than necessitated by the prior art.

We claim as our invention:

1. In combination with a tread building machine, a stitching mechanism comprising a plurality of stitching rollers, individual pivoted mounting fingers for each roller, means urging each of said rollers against the tread and an adjustable pivoted mounting common to said fingers adapted to regulate the normal pressure of all of said rollers.

2. In combination with a tread building machine, a stitching mechanism comprising a plurality of stitching rollers, individual pivoted mounting fingers for each roller, individual springs engaging each of said mounting fingers, and an adjustable pivoted mounting frame for said fingers adapted to regulate the initial pressure of said rollers.

3. A stitching mechanism comprising a plurality of individually mounted rollers arranged in two staggered interfitting groups whereby the rollers of one group project between the rollers of the other group to contact the entire surface of the material.

4. A stitching mechanism comprising a plurality of stitching rollers, individual movable mountings therefor supporting the rollers in two groups on parallel axes, the rollers of one group projecting between the rollers of the other group to operate on the entire surface of the material.

5. A stitching mechanism comprising a plurality of individually mounted rollers arranged in two staggered interfitting groups whereby the rollers of one group project between the rollers of the other group to contact the entire surface of the material and means for simultaneously varying the pressure of the individual rollers on the material.

6. A stitching mechanism comprising a plurality of stitching rollers, individual movable mountings therefor supporting the rollers in two groups on parallel axes, the rollers of one group projecting between the rollers of the other group to operate on the entire surface of the material and means for simultaneously varying the pressure of the individual rollers on the material.

7. In a machine for pressing layers of tacky material together, a support for the layers of material, rollers for exerting pressure on the material on said support, and means for supporting said rollers so as to cause them to operate on the material outwardly from the center line thereof as the layers are progressively pressed together.

8. In a machine for pressing layers of tacky material together, a support for the layers of material, rollers for exerting pressure on the material on said support, and means for supporting said rollers in substantially a V formation over said material so as to cause said rollers to progressively press the material outwardly from the center line of the material.

9. In a machine for pressing layers of tacky material together, a support for the layers of material, rollers arranged to progressively press the central portion of said layers of material, and other rollers arranged to thereafter press the marginal portions of said layers.

10. In a machine for pressing layers of tacky material together, a support for the layers of material, rollers arranged to progressively press the central portion of said layers of material, and other rollers of different diameters arranged to thereafter press the marginal portions of said layers, said first mentioned rollers being arranged in a V formation.

11. In a machine for pressing layers of tacky material together, a support for the layers of material, rollers arranged to progressively press the central portion of said layers of material, and other rollers arranged to thereafter press the marginal portions of said layers, said latter rollers comprising a plurality of groups of overlapping and interfitting rollers.

12. In a machine for pressing layers of tacky material together, a support for the layers of material, rollers arranged to progressively press the central portion of said layers of material, other rollers arranged to thereafter press the marginal portions of said layers, each of all of said rollers being individually and separately urged into engagement with said material, and means for contemporaneously varying the pressure of all of said rollers on said material.

13. In a machine for pressing layers of tacky material together, a support for the layers of material, rollers arranged to progressively press the central portion of said layers of material, other rollers arranged to thereafter press the marginal portions of said layers, a mounting for said first group of rollers to which the associated rollers are each individually and separately connected, a second mounting for said other group of rollers to which the associated rollers are each individually and separately connected, and a pivotal mounting connected to both of said other mountings.

14. In a machine for pressing layers of tacky material together, a support for the layers of material, rollers arranged to progressively press the central portion of said layers of material, other rollers arranged to thereafter press the marginal portions of said layers, a mounting for said first group of rollers to which the associated rollers are each individually and separately connected, a second mounting for said other group of rollers to which the associated rollers are each individually and separately connected, a pivotal mounting connected to both of said other mountings, and adjustable means for acting on said common mounting to contemporaneously vary the pressure of both groups of rollers on said material.

In testimony whereof, we have hereunto subscribed our names.

ARNOLD R. KRAUSE.
HOWARD O. HUTCHENS.